US010333826B1

(12) United States Patent
Govindswamy et al.

(10) Patent No.: US 10,333,826 B1
(45) Date of Patent: Jun. 25, 2019

(54) CONNECTIVITY STATE CONTROL FOR COMMUNICATION DEVICE

(71) Applicant: MBIT WIRELESS, INC., Irvine, CA (US)

(72) Inventors: Arumugam Govindswamy, Irvine, CA (US); Bhaskar Patel, San Clemente, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 206 days.

(21) Appl. No.: 15/608,094

(22) Filed: May 30, 2017

(51) Int. Cl.
| G06F 15/16 | (2006.01) |
| H04L 12/721 | (2013.01) |
| H04L 29/12 | (2006.01) |
| H04L 12/803 | (2013.01) |
| H04L 12/26 | (2006.01) |
| H04L 12/775 | (2013.01) |
| H04L 12/707 | (2013.01) |

(52) U.S. Cl.
CPC .......... *H04L 45/127* (2013.01); *H04L 47/125* (2013.01); *H04L 61/103* (2013.01); *H04L 43/0876* (2013.01); *H04L 45/24* (2013.01); *H04L 45/58* (2013.01)

(58) Field of Classification Search
CPC ....... H04L 45/127; H04L 45/24; H04L 45/58; H04L 47/125; H04L 61/103; H04L 43/0876
USPC ................ 709/201, 220, 223, 227, 230, 249
See application file for complete search history.

(56) References Cited

U.S. PATENT DOCUMENTS

| 7,502,012 B2* | 3/2009 | Hatano | G06F 1/1616 345/156 |
| 2011/0196547 A1* | 8/2011 | Park | G06Q 50/06 700/296 |
| 2012/0286428 A1* | 11/2012 | Sakuma | H01L 21/76898 257/774 |
| 2012/0314693 A1* | 12/2012 | Medapalli | H04W 40/02 370/338 |
| 2012/0326514 A1* | 12/2012 | Kim | H02J 9/005 307/66 |
| 2013/0031258 A1* | 1/2013 | Mukai | H04L 12/6418 709/227 |
| 2014/0153556 A1* | 6/2014 | Wu | H04L 12/66 370/338 |
| 2015/0163743 A1* | 6/2015 | Narasimha | H04W 52/0254 370/311 |
| 2016/0036772 A1* | 2/2016 | Pratapa | H04L 61/2061 709/245 |

(Continued)

*Primary Examiner* — Michael Won

(57) ABSTRACT

Internet, voice calls, and messaging services have become ubiquitous and the means by which the services are accessed varies widely. The number and types of devices that may use these services have also proliferated. To serve a number and variety of client devices, a Service Distribution Device (SDD) may be used, which is a device that includes a modem for mobile broadband access and a short range wireless link to distribute the services to local devices which may have such connectivity. Power consumption of an SDD which may continuously broadcast signals is an important consideration. A method and apparatus are disclosed that enable adaptive and seamless selection of the best mode of operation for the SDD such that the power consumption may be reduced while providing uninterrupted service to the client devices.

24 Claims, 14 Drawing Sheets

(56) References Cited

U.S. PATENT DOCUMENTS

2016/0094515 A1* 3/2016 Chechani .............. H04W 12/08
726/1

* cited by examiner

CONNECTIVITY STATE CONTROL FOR COMMUNICATION DEVICE

BACKGROUND

Internet access is becoming ubiquitous and the means by which the access is obtained varies widely. For example, the internet access may be through a Digital Subscriber Line (DSL), a cable modem, a fiber optic network, a wireless communication network, etc. When the internet service offers high data rates it is often referred to as broadband internet service. Broadband internet service is generally understood to be a service that is always on and offers data rates in the order of mega-bits per second for both download and upload.

A client device as defined in the present disclosure is a device that may access the internet from one or more of the sources from which the internet service may be available. Such client devices may include conventional devices such as a smartphone, a tablet, a feature-phone, a laptop or a desktop personal computer, etc. Other client devices may include devices that are embedded within devices that perform other functions such as an entertainment system in a home or in an automobile, a home appliance such as a refrigerator or washer/dryer, a wristwatch with a heart rate monitor, a medical device such as a blood pressure meter or insulin sensor, a utility meter, a gaming console, a camera, a navigation device, industrial equipment, etc. These types of devices are collectively referred to herein as machine type client devices.

These diverse types of client devices may access the internet service directly through one of the sources of primary internet access mentioned earlier. Alternatively, the client devices may access the internet through a local network that performs distribution of the primary internet access to the users localized in a given area. Examples of such local networks include Local Area Network (LAN) using Ethernet, Wireless LAN (WLAN) commonly known as Wi-Fi, Bluetooth™, or some other local area networking schemes. Such short range wireless networks are referred herein as Short Range Wireless Links (SRWL). When a client device is in the proximity of a location where such a LAN or WLAN access is available, it may access the internet using the LAN or WLAN. FIG. 1 illustrates an example scenario of client devices accessing internet over a WLAN network, which is connected to a traditional wireline internet service such as DSL or cable modem. The local area where WLAN service is available is often referred to as Hotspot. The device that offers the WLAN service in a given local area is referred to as an Access Point (AP). In the present disclosure, the terms Hotspot AP or Hotspot are used interchangeably to refer the device that offers the WLAN service in a given local area.

A Hotspot AP may be connected to DSL or cable modem through any of the standardized interfaces such as Universal Serial Bus (USB), Ethernet, or proprietary interfaces. In some cases, the DSL or cable modem and the Hotspot AP may be part of a single physical device. In such cases the interface between the DSL or cable modem and AP may use Secure Digital Input Output (SDIO) or other suitable interface.

Client devices may also obtain internet access over mobile wireless networks. These mobile wireless networks are often referred to as Wireless Wide Area Network (WWAN). The internet service offered by such networks is often referred to as mobile broadband internet or Mobile Broadband (MB) and the mobile wireless networks are often referred to as mobile broadband networks. The terms WWAN and MB are used interchangeably herein.

As the variety of client devices has increased and the demand for MB access has increased, a device known as a mobile Hotspot is commonly used. A mobile Hotspot device includes both a modem for MB access and a WLAN AP (Hotspot AP) to distribute the internet to local client devices. FIG. 2 illustrates the block diagram of an example mobile Hotspot device. As shown in FIG. 2, for the chosen example, the MB modem and the Hotspot AP may be connected to each other via one of the standard interfaces used in the industry such as USB, SDIO, or proprietary interfaces. In another mobile Hotspot example, the MB modem and the WLAN AP may be a single Integrated Circuit (IC) as shown in FIG. 3.

Some mobile Hotspot devices may serve as a single function device, i.e., they only perform the mobile Hotspot function. Such mobile Hotspots may take many different form factors such as a mobile Hotspot integrated into an automobile, a standalone device that can be carried around with or without a battery, integrated into an accessory device for a tablet, a standalone device that can be powered by a wall outlet, etc.

Some client devices have multiple capabilities and being a Hotspot is one of the capabilities. For example, a smartphone may have a mobile broadband modem that may be used to get mobile internet service directly from the mobile broadband network as illustrated in FIG. 4. The flow of data is as shown in FIG. 4 from the mobile broadband modem to the application processor that processes the download and upload data and interacts with the user via the display and other elements of the user interface such as audio, vibration, etc. The smartphone may also have a WLAN modem to access internet service over a Hotspot AP. When it is in the vicinity of a Hotspot AP, it may use internet service from the Hotspot as illustrated in FIG. 1. In another smartphone example, the mobile broadband modem, the WLAN AP and the Application Processor may be integrated into a single Integrated Circuit (IC) as shown in FIG. 5.

A smartphone may also serve as a mobile Hotspot to provide internet service over WLAN to other client devices in its vicinity. FIG. 6 illustrates an example scenario where the smartphone serves as a mobile Hotspot and provides internet service to a machine type client device which may have only a WLAN access. In another smartphone mobile Hotspot example, the mobile broadband modem, the WLAN AP and the Application Processor may be integrated into a single IC as shown in FIG. 7.

A client device may use a mobile Hotspot, a Hotspot, or a mobile broadband network when internet access is required. An example of a mobile broadband network is the Long Term Evolution (LTE) from the $3^{rd}$ Generation Partnership Project (3GPP). The LTE technology and its evolution are often referred to as fourth generation (4G) technologies. A client device may also use any of the previous generation technologies such as "2G", "3G" from 3GPP and other standardization bodies. A client device may also use future generation technologies for Hotspot, mobile Hotspot, and mobile networks. Different sources of internet are generically referred to as networks herein.

Although a Hotspot or mobile Hotspot may be able to obtain internet service and distribute it to multiple client devices in a given local area, it may not be able to provide other key services that users commonly use. For example, voice calls and SMS based text messaging remain two of the most commonly used applications in client devices. A client device accessing the internet through a Hotspot or mobile Hotspot may still be receiving voice calls or SMS based text messages directly through the WWAN as illustrated in FIG. 8. Four interconnected networks are shown in FIG. 8: Public Switch Telephone Network (PSTN) 802, WWAN 804, internet 806, and WLAN (Hotspot) 808. The PSTN is connected to the WWAN through the interface 820 and to the internet through the interface 822. The WWAN and internet are connected through the interface 818. The Cable modem 812 is connected to the internet through the interface 824. These interfaces may use open industry standards or may use proprietary standards. The Hotspot, in the present example, is connected to the internet using a Cable modem interface. In the present example, the Smartphone 813 is connected to the Hotspot Access Point 810 for internet service through the Cable modem 812. Simultaneously, it is also connected to the WWAN 804 for voice calls and SMS based text messaging. The Smartphone 813 may exchange SMS based text messages with the Smartphone 814 over the WWAN 804. The Smartphone 813 may have voice calls with the landline phone 816 through WWAN 804 and PSTN 802. The cordless phone 826 may access the conventional landline voice service through the cordless base 828 which in turn is connected to the PSTN 802 though the conventional landline interface 830. The coverage area 808 of the WLAN Hotspot and the coverage area 832 of the cordless base 832 may partially or fully overlap.

The Voice over Internet Protocol (VoIP) is a protocol commonly used to provide voice, video, and other streaming services over internet. In addition to VoIP, a comprehensive set of protocols and frameworks such as Session Initiation Protocol (SIP) and Internet Protocol Multimedia System (IMS) are used to provide Rich Communication Services (RCS) over internet. Although many so called "over-the-top" applications and services such as Skype™ are available to use for voice calls and text messaging over the internet service provided by a Hotspot or a mobile Hotspot, they are limited by the number of users who have the same applications and are online at any given time. Therefore, a more comprehensive solution using SIP and its related technologies are more broadly adopted by WWAN operators.

There may be Hotspot or mobile Hotspot devices that enable all the services for a client device including voice and video calls, SMS based text messaging, and internet to be provided by a single local device. For example, a network architecture as described in MBIT 3.0-080I, incorporated by reference herein, which includes a network element, referred to herein as Base Mobile Device (BMD) 910 as illustrated in FIG. 9, may be used. The BMD 910 may comprise a modem such as DSL modem to connect with the Internet through the link 930. The BMD 910 may comprise a modem for a WWAN. The BMD 910 may perform authentication and registration with the WWAN to be able to access all the services available from the wireless network. The BMD may also comprise a modem for one of the SRWL such as WLAN. For example, the BMD may act as an Access Point for providing internet service over SRWL to the client devices that may be present in its coverage area 908. A client device that is able to connect and get internet service from the BMD is referred to herein as Group Member Device (GMD). For example, the Smartphones 912, 914 and 916 and the laptop 917 are the GMD's. The BMD may connect with the GMD's through the SRWL such as WLAN. The BMD may also connect with the GMD's through the wired connection such as Ethernet LAN 909. Example use cases of GMD's may be some or all the client devices in a home, some or all the client devices in a small office, or some or all the client devices in a mobile vehicle, etc. The BMD may provide all the services to GMDs (client devices) including voice and video calls, SMS based text messaging, and internet.

Typically, as shown in FIG. 10, a WWAN comprises elements such as client devices or mobile stations and one or more base stations. Other network devices may also be employed, such as a mobile switching center (not shown). As illustrated in FIG. 10, the communication path from the base station (BS) to the client device or mobile station (MS) is referred to herein as a downlink (DL) direction or downlink channel. The communication path from the client device to the base station is referred to herein as an uplink (UL) direction or uplink channel. In some wireless communication systems, the MS communicates with the BS in both the DL and UL directions. For instance, such communication is carried out in cellular telephone systems. In other wireless communication systems, the client device communicates with the base stations in only one direction, usually the DL. Such DL communication may occur in applications such as paging. Typically in a wireless communication system, the client device and the base station may transmit information in blocks of data and such a block of data is referred to herein as a "message."

A base station to which the client device may be downlink synchronized and/or communicating with at any given time is referred herein as the Serving Base Station (SBS). In some wireless communication systems the serving base station may be referred to as the serving cell. The base stations that are in the vicinity of the serving base station are called Neighbor Base Stations (NBS). Similarly, in some wireless communication systems a neighbor base station may be referred to as a neighbor cell.

A client device, after initially synchronizing with a cell, may switch to another cell depending on the signal conditions, network congestion, and other criteria. The process of switching from one cell to another cell by a client device is often referred to as handover (HO) or cell reselection. In some wireless communication systems handover is also referred to as handoff. Also in some wireless communication systems cell reselection is also referred to as idle mode handoff. An NBS, to which a client device may be switching over its communication from the current SBS, is herein referred to as Target Base Station (TBS). In some wireless communication systems, a target base station is normally referred to as a target cell. Sometimes, during a handover, the serving cell and the target cell may be the same and only the channel used for communication may be changed. Such a handover, in which the cell is not changed, is called an intra-cell handover. The purpose of intra-cell handover may be that the new channel is better suited for communication than the previous channel within the same cell. Cell reselections or handovers amongst cells that use the same frequency are referred herein as intra-frequency cell reselection or handover. Cell reselections or handovers amongst cells that use different frequencies are referred herein as inter-frequency cell reselection or handover. A network may use different Radio Access Technologies (RATs) for providing various services. In a particular network, the cells of different RAT types may be overlapping or adjacent to each other. If a neighbor cell is using a RAT type that is different from the RAT type used by the serving cell, it is referred to as an inter-RAT neighbor cell.

The decision making process for handovers and cell reselections varies from one wireless communication system to another. However, the decisions are generally based on the signal conditions measurements by the client devices and reporting of those measurements to the wireless communication network by the client devices. The wireless communication network generally may influence and control the measurements and reporting process of the client device by providing parameters for the measurement and reporting process. The actual decision to perform handover may be made either by the wireless communication network or by the client device depending on the type of particular wireless communication system. On the other hand the cell reselection decisions in idle mode (i.e., when client device is not in active communication with the wireless communication network) may be generally performed autonomously by the client device. Both handovers and cell reselections may normally lead to change of cell from which the client device may access communication services. The difference between the handover procedure and cell reselection procedure depends generally on whether a client device is engaged in an active communication with the wireless communication network. In idle mode, a client device may periodically wake up to, for example receive paging messages and go to sleep by powering off most of its hardware for remainder of the duration to reduce power consumption. This is often referred to as Discontinuous Reception (DRX).

Normally, certain types of system information may be required by all client devices so that they may communicate with the wireless communication network. The system information typically includes system synchronization information, system parameters, resource allocation information, paging information, etc. The wireless communication network may transmit such system information as broadcast data so that all client devices within its coverage area may be able to receive. Such information is herein referred to as "broadcast messages."

Similar to some client devices, a Hotspot, mobile Hotspot or BMD may also be battery operated device. For battery operated Hotspot, mobile Hotspot or BMD devices, their power consumption may be an important consideration. Power consumption may also be a consideration for non-battery operated Hotspot, mobile Hotspot or BMD devices because they may normally continuously transmit broadcast information. Although a Hotspot, mobile Hotspot, or a BMD may serve one or more client devices, often there may not be a single client device requesting or using the service. Under such conditions, it may be desirable to reduce the power consumption of the Hotspot, mobile Hotspot, or BMD.

SUMMARY

A method and apparatus are disclosed that enable a Hotspot, mobile Hotspot or BMD device to reduce its power consumption while providing uninterrupted service to the client devices connected to it without significant increase in latency.

In accordance with an aspect of the present disclosure, a method for controlling a connectivity state of a communication device may include controlling, by a processing device at the communication device as a Service Distribution Device (SDD), tracking a number and type of client devices connected to the SDD and a number and type of client devices actively receiving service from the SDD; determining a next internal mode of operation of the SDD, based on the number and type of client devices connected to the SDD and the number and type of client devices actively receiving service from the SDD; informing a Wireless Wide Area Network (WWAN) about the next internal mode; and entering the next internal mode at the SDD, after the informing the WWAN about the next internal mode.

In one alternative, the method may include controlling, by the processing device, when no client device is actively receiving or requesting service from the SDD, selecting a lowest power mode as the next internal mode of operation; and after the next internal mode of operation is selected, informing the WWAN about the next internal mode.

In one alternative, the method may include controlling, by the processing device, when the SDD is using a 3rd Generation Partnership Project Long Term Evolution (3GPP LTE) based WWAN, deciding whether to enter a Power Saving Modem (PSM) according to the 3GPP's specifications as the next internal mode, based on number and type of second client devices connected to the SDD and whether the second client device are actively requesting service from the SDD.

In one alternative, the method may include controlling, by the processing device, when at least one third client device connects to the SDD over a Short Range Wireless Links (SRWL), exiting the PSM mode with the WWAN and beginning to provide service to the at least one third client device with a predetermined latency.

In one alternative, the method may include controlling, by the processing device, when each second client device connected to the SDD is a delay tolerant device, entering a Discontinuous Reception (DRX) mode with a predetermined DRX cycle value as the next internal mode at the SDD.

In one alternative, the method may include controlling, by the processing device, when the SDD is using a 3rd Generation Partnership Project Long Term Evolution (3GPP LTE) based WWAN, deciding to use an extended DRX (eDRX) mode according to the 3GPP's specifications as the next internal mode, in which in the eDRX mode the SDD and each of the second client device enter a predetermined low power mode for at least a predetermined time.

In one alternative, the method may include controlling, by the processing device, when at least one third client device that is delay sensitive is connected to the SDD, exiting the eDRX mode and beginning to provide service to the at least one third client device with a predetermined minimal latency.

In one alternative, the method may include controlling, by the processing device, entering a joint Power Saving Modem (PSM) and extended Discontinuous Reception (eDRX mode) according to 3rd Generation Partnership Project Long Term Evolution (3GPP LTE) specification as the next internal mode, based on number and type of second client devices connected to the SDD and whether an active service is being provided to the second client devices from the SDD.

In one alternative, the method may include controlling, by the processing device, determining to stop performing neighbor cell detection and neighbor cell measurements when no client device is connected to the SDD.

In one alternative, the determining whether to stop performing neighbor cell detection and measurements may be based on an identified usage pattern.

In one alternative, the method may include controlling, by the processing device, determining to stop performing periodic updates of broadcast System Information (SI) when no client device is connected to the SDD.

In one alternative, the method may include controlling, by the processing device, determining to stop performing a serving cell System Information (SI) update based on an identified usage pattern.

In one alternative, the method may include controlling, by the processing device, when no client device is connected to the SDD, deregistering of the SSD with the WWAN.

In one alternative, the method may include controlling, by the processing device, when a second client device attempts to connect to the SDD over a Wireless LAN (WLAN) or Short Range Wireless Links (SRWL), performing registration when the SDD is not registered to the WWAN.

In one alternative, the method may include controlling, by the processing device, profiling a service usage pattern from each different second client device served by the SDD and, based on an identified usage pattern, autonomously changing an internal mode of the SDD and performing a predetermined procedure with the WWAN.

In one alternative, the method may include controlling, by the processing device, configuring the SDD with a time of day and a day of a week on which the SDD provides service.

In one alternative, the method may include controlling, by the processing device, profiling usage and detecting that at least one first application is performing a periodic status update as opposed to active data transfer; and entering a next lower power mode as the next internal mode when periodic background access is determined.

In one alternative, the periodic background access may be availability status information.

In one alternative, the method may include controlling, by the processing device, detecting status update type of background activity based on at least one of periodic nature of traffic, size of message payloads, or source and destination address pairs.

In one alternative, when the SDD is operating in the next lower power mode, the least one first application may be continuing to update availability status at less than a predetermined rate.

In one alternative, the predetermined rate may be a predetermined Discontinuous Reception (DRX) or extended DRX (eDRX) cycle.

In one alternative, the method may include controlling, by the processing device, based on a usage pattern, autonomously changing a beacon signal interval on a Wireless Local Area Network (WLAN) Access Point (AP) of the SDD (i) to at least a predetermined value when no client device is expected to seek service from the SDD and (ii) to less than the predetermined value when a second client device is expected to seek service from the SDD.

In one alternative, the method may include controlling, by the processing device, entering at the WLAN AP in the SDD as the next internal mode a predetermined lower power state including at least one of Power Save Polling Mode (PSPM), Scheduled and Unscheduled Automatic Power Save Delivery (S-APSD and U-APSD) or Wi-Fi Multimedia (WMM) Power Save.

In one alternative, the method may include controlling, by the processing device, when a type of each second client device connected to the SDD is delay tolerant, autonomously changing a beacon interval on a Wireless Local Area Network (WLAN) Access Point (AP) of the SDD to at least a predetermined value.

In one alternative, the method may include controlling, by the processing device, when a type of at least one second client device connected to the SDD is delay sensitive, autonomously changing a beacon interval on a Wireless Local Area Network (WLAN) Access Point (AP) of the SDD to at most a predetermined value.

In accordance with an aspect of the present disclosure, an apparatus for controlling a connectivity state of a communication device may include circuitry configured to control, at the communication device as a Service Distribution Device (SDD), tracking a number and type of client devices connected to the SDD and a number and type of client devices actively receiving service from the SDD; determining a next internal mode of operation of the SDD, based on the number and type of client devices connected to the SDD and the number and type of client devices actively receiving service from the SDD; informing a Wireless Wide Area Network (WWAN) about the next internal mode; and entering the next internal mode at the SDD, after the informing the WWAN about the next internal mode.

In accordance with an aspect of the present disclosure, a wireless communication device may include a receiver to receive a wireless communication; and a processing device configured for controlling a connectivity state of the wireless communication device as a Service Distribution Device (SDD), wherein the processing device is configured to control tracking a number and type of client devices connected to the SDD and a number and type of client devices actively receiving service from the SDD; determining a next internal mode of operation of the SDD, based on the number and type of client devices connected to the SDD and the number and type of client devices actively receiving service from the SDD; informing a Wireless Wide Area Network (WWAN) about the next internal mode; and entering the next internal mode at the SDD, after the informing the WWAN about the next internal mode.

DETAILED DESCRIPTION

Figure 1:
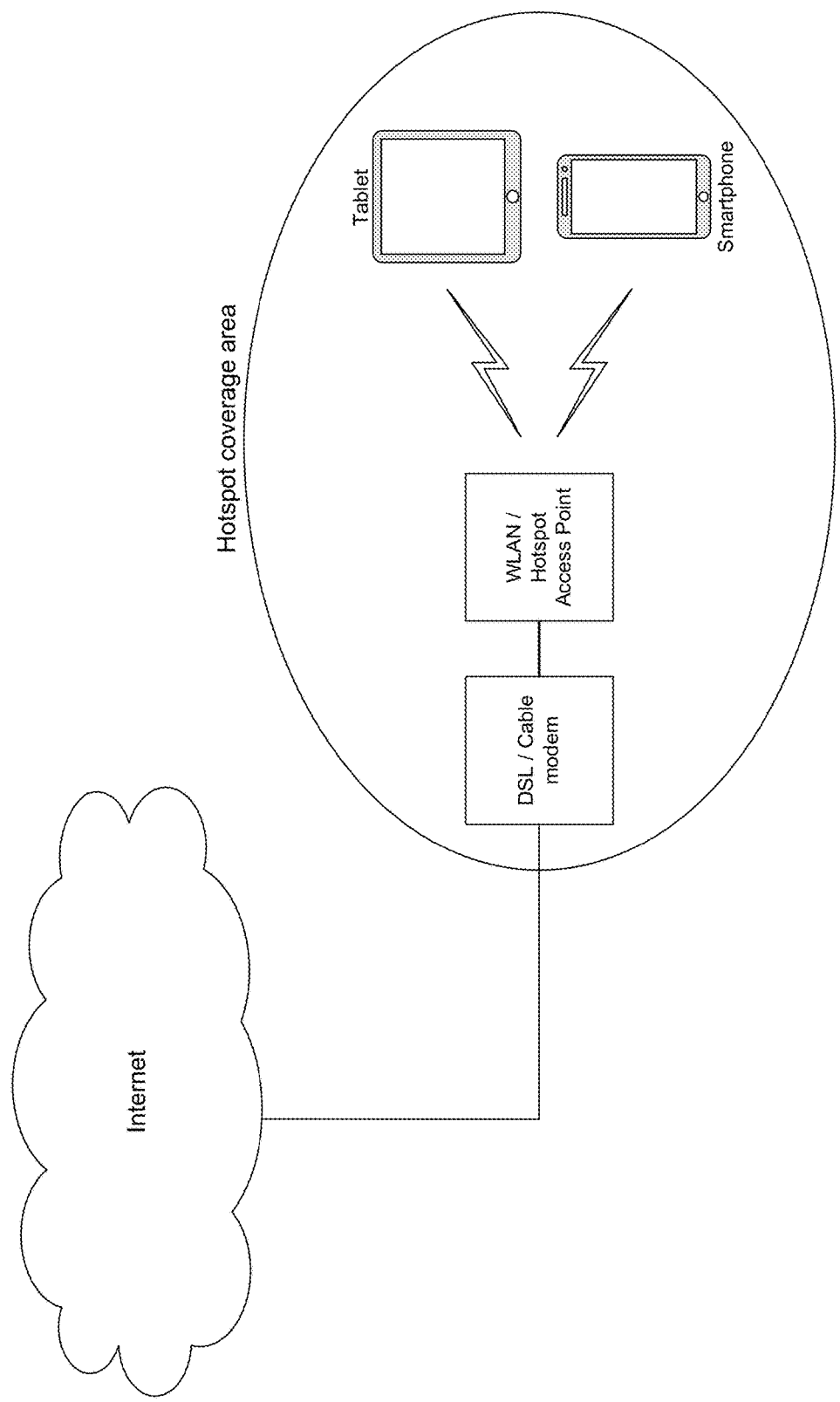
FIG. 1 illustrates an example scenario of internet access using WLAN network over a traditional wire-line internet service.
Figure 2:
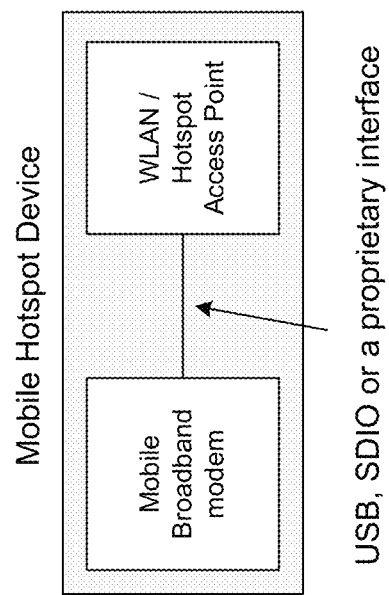
FIG. 2 illustrates a high level block diagram of a mobile Hotspot device.

The foregoing aspects, features and advantages of the present disclosure will be further appreciated when considered with reference to the following description of exemplary embodiments and accompanying drawings, wherein like reference numerals represent like elements. In describing the exemplary embodiments of the disclosure illustrated in the appended drawings, specific terminology will be used for the sake of clarity. However, the disclosure is not intended to be limited to the specific terms used.

Although aspects of the present disclosure are illustrated using a particular type of mobile Hotspot, the disclosure may be applicable to other types of Hotspot, mobile Hotspot, or BMD devices, some of which are listed in an earlier section of the present disclosure. In the remainder of the present disclosure the Hotspot, mobile Hotspot, and BMD are commonly referred to as a Service Distribution Device (SDD).

The types of client devices connected to an SDD may vary. For example, a standard laptop or a desktop Personal Computer (PC), a tablet, etc. may be connected for internet service. Another type device, referred to as machine type device, may be deeply embedded devices inside appliances such as a refrigerator, a washer, a dryer, etc. which may use internet service. This type of devices may have different service requirements such as they may be more delay tolerant than other types of client devices. Another type of device may be a smartphone which may use multiple services such as internet, voice calls, SMS, etc. from the SDD. Another type of device may be a cordless phone inside a home or office which may connect to the SDD only for voice calls.

According to an aspect of the present disclosure, an SDD may keep track of the number and type of client devices connected to it and the number and type of client devices actively getting service from it. According to an aspect of the present disclosure, the SDD may use this information to determine its next internal mode of operation, and then may perform required procedure to inform the WWAN about its next internal mode after which the SDD may enter its next internal mode. The required procedure for informing the WWAN may depend on the particular Radio Access Technology (RAT) type used by the WWAN.

Although the aspects of the present disclosure are described using the 3GPP LTE as an example for a RAT type used by a WWAN for an SDD, the aspects described herein are applicable to WWANs of other RAT types such as 3GPP Wideband Code Division Multiple Access (WCDMA), High Speed Packet Access (HSPA), Global System for Mobile communication (GSM), Code Division Multiple Access (CDMA), etc. Similarly, although the WLAN is used as an example SRWL for an SDD, other SRWL such as Bluetooth™ may be used by an SDD.

According to an aspect of the present disclosure, if there is no client device actively getting or requesting service from an SDD, the SDD may select the lowest power mode as the next mode of operation and then may perform the required procedure with the WWAN to inform the network about its mode of operation. For example, if the SDD is using a 3GPP LTE based WWAN, it may decide to enter the Power Saving Modem (PSM), defined in Release 12 of the 3GPP specifications, as a function of the number and type of client devices connected to it and whether they are actively requesting service from the SDD. According to an aspect of the present disclosure, if one or more client device connects to the SDD over SRWL, the SDD may exit the PSM mode with the WWAN and begin to provide service to the new client device with minimal perceived initial latency in getting the service.

According to an aspect of the present disclosure, if all the client devices connected to the SDD are delay tolerant devices, the SDD may enter the DRX mode with a long DRX cycle value. For example, if the SDD is using a 3GPP LTE based WWAN, it may decide to use extended DRX (eDRX) mode, defined in Release 13 of 3GPP specifications, which may allow the SDD and therefore the client devices to enter very low power mode for an extended duration in the order of more than 40 minutes. According to an aspect of the present disclosure, if one or more client device that is delay sensitive connects to the SDD, the SDD may exit the eDRX mode with the WWAN and begin to provide service to the new client device with minimal perceived initial latency in getting the service.

According to an aspect of the present disclosure, an SDD may enter joint PSM and eDRX mode depending on the number and type of client devices connected to it and whether there is an active service being provided.

According to an aspect of the present disclosure, an SDD may determine to stop performing neighbor cell detection and neighbor cell measurements if there is no client device connected to the SDD. According to an aspect of the present disclosure, an SDD may determine to stop performing neighbor cell detection and measurements based on the identified usage pattern. For example, the SDD may stop performing neighbor cell detection and measurements during certain hours of a day with no active usage from any of the client devices.

According to an aspect of the present disclosure, an SDD may determine to stop performing periodic updates of the broadcast System Information (SI) if there is no client device connected to the SDD. According to an aspect of the present disclosure, an SDD may determine to stop performing serving cell SI update based on the identified usage pattern. For example, the SDD may stop performing SI update during certain hours of a day with no active usage from any of the client devices.

According to an aspect of the present disclosure, if there is no client device connected to the SDD, it may deregister with the WWAN. According to an aspect of the present disclosure, if a client device attempts to connect to the SDD over its WLAN or any other SRWL, the SDD may first perform registration if not already registered to the WWAN.

According to an aspect of the present disclosure, an SDD may profile the service usage patterns from all the different client devices served by it and based on the identified usage pattern, it may autonomously change its own internal mode and perform required procedures with the WWAN. For example, the SDD may enter PSM and/or eDRX mode during certain hours of a day with no active usage from any of the client devices. The usage pattern for different deployment scenario of a mobile Hotspot may be different. For example, a home, an office, a café, a warehouse, etc. may have different usage patterns. The usage pattern for each of these deployments may be adaptively determined by the mobile Hotspot based on client device activity over a configurable period of time, for example, several days.

According to an aspect of the present disclosure, an SDD may provide capability for configuration of the time of the day and days of the week on which the SDD may provide service. For example, in an office environment, during weekend, the SDD may be configured to deregister from the WWAN or completely power down and automatically wakeup and register to network before workday begins in the office.

There are many applications that may not be used actively by a user at a certain time, but these applications continue to update their internal status and update the availability or presence of the user to the various contacts in the user's address book for each of the application. For example, a Skype user may not be using Skype when he/she is asleep but the Skype application may continue to periodically update its internal status and its availability to users in the contact list of the user. In another example, the WhatsApp™ application may continue to send and receive availability status even when the user is not actively using the application. Such background processes may create small but periodic and continuous access over an SDD. Under these conditions, a conventional SDD may erroneously conclude that there is an active internet usage even though the user is not actually actively using these applications. According to an aspect of the present disclosure, the SDD may profile such usage and detect that these applications are doing periodic status update as opposed to active data transfer and the SDD may enter next lower power mode even though there is periodic background access such as availability status information. For example, the status update type of background activity may be detected based on the periodic nature of traffic, the size of the message payloads, source and destination address pairs, etc. The SDD may select its low power mode such that the applications may be able to continue to update the availability status but at a much less frequent rate. For example, the SDD may select a much longer DRX or eDRX cycle.

A WLAN AP periodically transmits a beacon signal which is needed for client devices to receive information about the AP. The WLAN AP beacon signal includes information such as Service Set Identifier (SSID), Timestamp, and various other critical parameters. According to an aspect of the present disclosure, based on the usage pattern, an SDD may autonomously change the beacon signal interval on its WLAN AP to a longer value when no client devices are expected to be seeking service and may autonomously change the beacon interval on its WLAN AP to a shorter value when client devices are expected to be seeking service. The WLAN AP in the SDD may also enter other lower power states such as Power Save Polling Mode (PSPM), Scheduled and Unscheduled Automatic Power Save Delivery (S-APSD and U-APSD), Wi-Fi Multimedia (WMM) Power Save, etc.

According to an aspect of the present disclosure, if the type of all the client devices connected to the SDD is delay tolerant, the SDD may autonomously change the beacon interval on its WLAN AP to a longer value. According to an aspect of the present disclosure, if the type of at least one of the client devices connected to the SDD is delay sensitive, the SDD may autonomously change the beacon interval on its WLAN AP to a shorter value.

Figure 11:
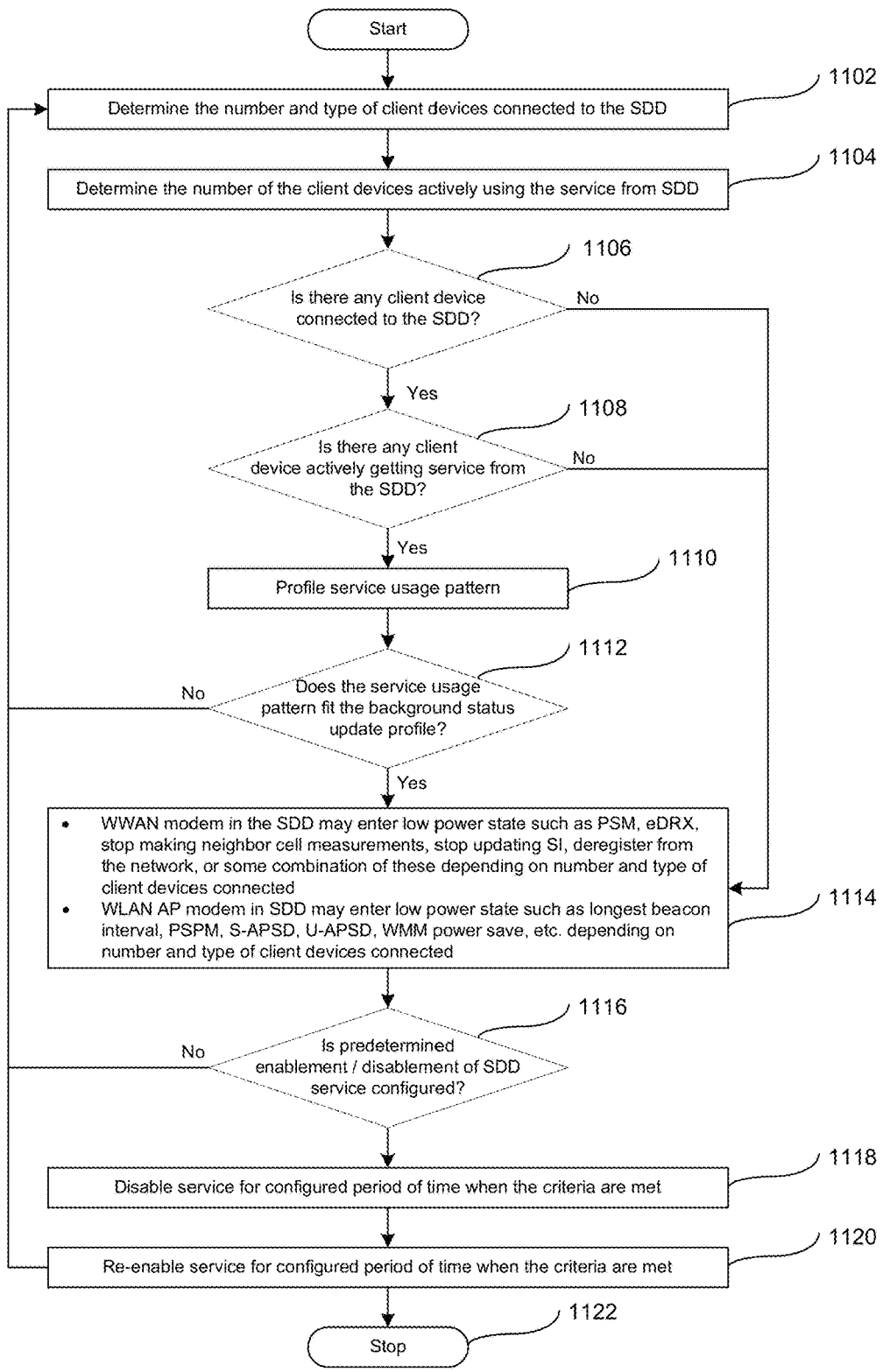
FIG. 11 illustrates an example flow diagram for processing steps for reduced power consumption in a Service Distribution Device (SDD) while providing uninterrupted service to the client devices according to aspects of the present disclosure.

The flow diagram 1100 contained in FIG. 11 illustrates an exemplary power saving method for SDD according to various aspects of the present disclosure. At processing stage 1102, a determination is made about the number and type of client devices connected to the SDD over SRWL. The type of client devices may be categorized as "delay-tolerant" and "delay-sensitive". This type of information may be exchanged when the client devices first connect to the SDD over SRWL. At processing stage 1104, a determination is made regarding the number of client devices actively using the service from SDD over SRWL. At processing stage 1106, a determination is made whether there is any client device connected to the SDD. If there is no client device connected to the SDD over SRWL, the processing continues to processing stage 1114. If there is at least one client device connected to the SDD, the processing continues to processing stage 1108. At processing stage 1108, a determination is made whether there is any client device actively getting service from the SDD over SRWL. If there is no client device actively getting service from the SDD over SRWL, the processing continues to processing stage 1114. If there is at least one client device actively getting service from the SDD over SRWL, the processing continues to processing stage 1110. At processing stage 1110, the SDD may perform profiling of a service usage pattern of each client device. This may include keeping track of the periodicity or lack of periodicity (i.e., randomness), size and ratio of transmit and receive messages, and other attributes of the messages exchanged with each client and possibly for each application within each client. For example, each application within a client may be identified based on the header of various protocols such as Transmission control Protocol (TCP), User Datagram Protocol (UDP), Internet Protocol (IP), and other higher layer protocols used in internet. The usage pattern data may be collected over a configurable period of time, e.g., several days, and then may be continually updated. Additional parameters such as Quality of Service (QoS) field that may be used in the messages, source and destination address pairs used in the messages, etc. may be tracked for profiling. Furthermore, the general behavior of commonly used applications may be profiled offline and a model of the general behavior of such applications may be used by the SDD during runtime as a template and use the profiling information from specific client devices to create a specific behavior model for the specific client devices connected to a particular SDD. At processing stage 1112, a determination is made whether the service usage pattern fits the background status update type usage. The background status update type of usage tends to have a periodic nature with relatively long durations (e.g., in the order of several seconds) with relatively small payloads and possibly with a constant source and destination addresses. There may be other attributes which may be considered for profiling. If the service usage pattern does not fit the background status update type usage, then the processing returns to processing stage 1102, otherwise the processing continues to processing stage 1114. At processing stage 1114, the WWAN modem in the SDD may enter a low power mode such as PSM, eDRX, stop making neighbor cell measurements, stop updating SI, deregister from the WWAN, or some combination of these depending on the number and type of client devices connected to the SDD. The WLAN AP modem in SDD may also enter a low power mode such as use of longest beacon interval, PSPM, S-APSD, U-APSD, WMM Power Save, etc. depending on number and type of client devices connected to the SDD. In this mode, the entire SDD comprising the WWAN modem, the WLAN AP modem, and other modules may be operating in a very low power mode. At processing stage 1116, a determination is made whether predetermined enablement and disablement of SDD service configured. For example, in an office environment, the SDD may be configured by a system administrator to disable service during weekend and enable service during week days at specific times of a day. If the predetermined enablement and disablement of SDD service is not configured, the processing returns to processing stage 1102, otherwise the processing continues to processing stage 1118 where the SDD service may be disabled as per configuration. At processing stage 1120, the SDD service may be re-enabled as per configuration. At this point the processing either returns to processing stage 1102 or suitably terminates at stage 1122.

Although the term "mobile Hotspot" is used herein to describe the various aspects of the present disclosure, the disclosure may be applicable to any Hotspot that may be using a WWAN and the Hotspot may not necessarily be mobile. Furthermore, the connectivity between the Hotspot device and the client devices may not necessarily be SRWL. For example, the Hotspot device and the client devices may be communicating over a wired connection such as Universal Serial Bus (USB), Universal Asynchronous Receiver/Transmitter (UART), Inter-Integrated Circuit (I2C), General Purpose Input/Output (GPIO), Ethernet cables, etc. In one example of connectivity, the client devices may be connected to the Hotspot over Ethernet for internet connection but may continue to use the WWAN for other services. In this case the Hotspot may use its own WWAN modem to get internet service and distribute it to other client devices over the Ethernet.

Figure 3:
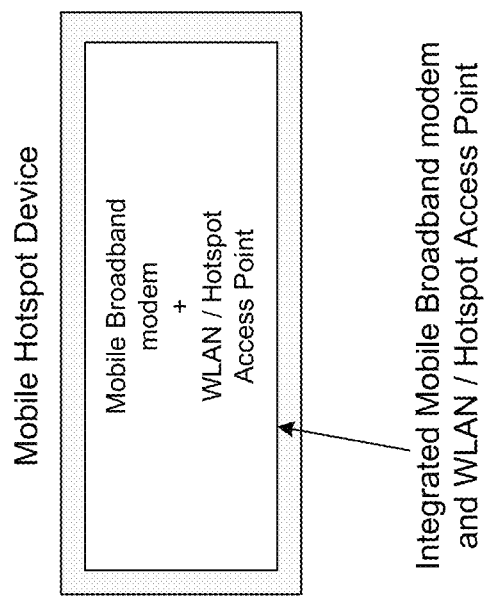
FIG. 3 illustrates a high level block diagram of an example mobile Hotspot device with an integrated mobile broadband modem and WLAN Access Point.
Figure 4:
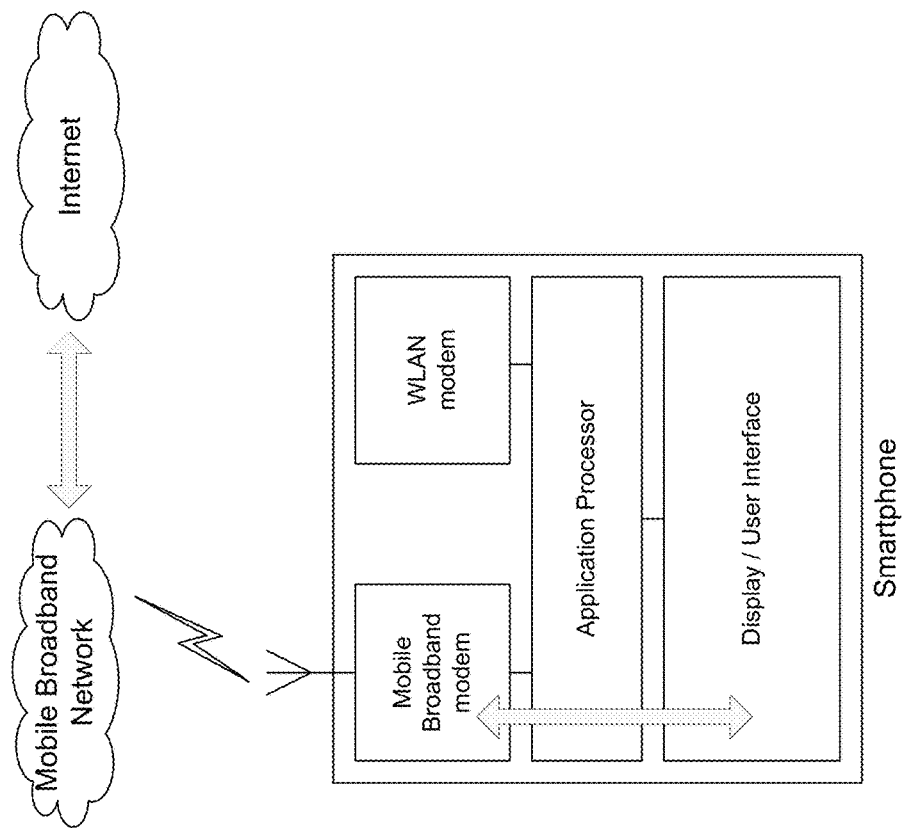
FIG. 4 illustrates a use case of internet access over a mobile broadband network by a smartphone client device.
Figure 5:
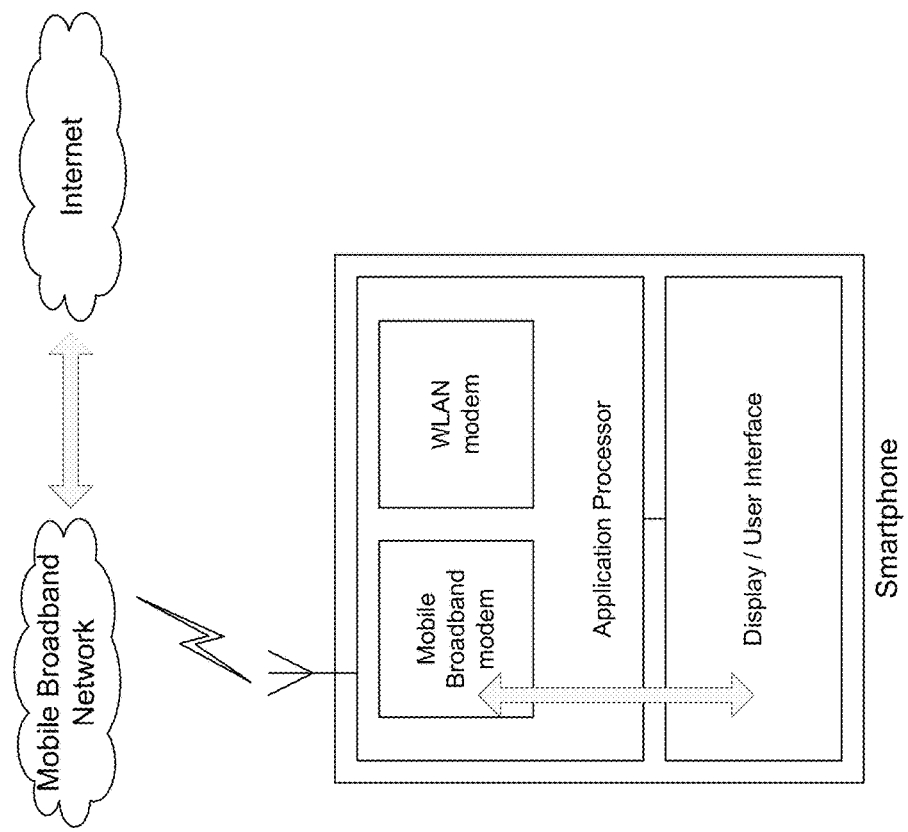
FIG. 5 illustrates a use case of internet access over a mobile broadband network by a smartphone client device with an integrated mobile broadband modem, WLAN Access Point, and Application Processor.
Figure 6:
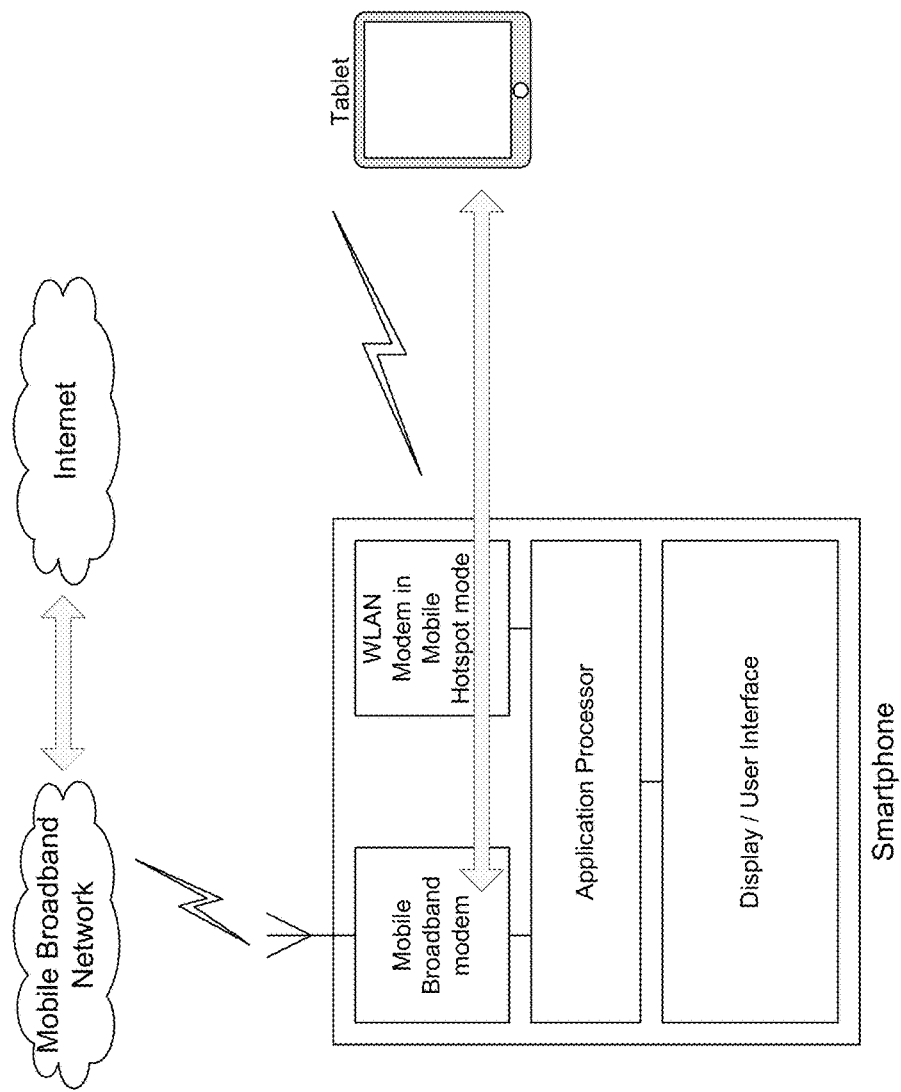
FIG. 6 illustrates a use case of internet access over a WLAN network by a client device through a smartphone operating in mobile Hotspot mode.
Figure 7:
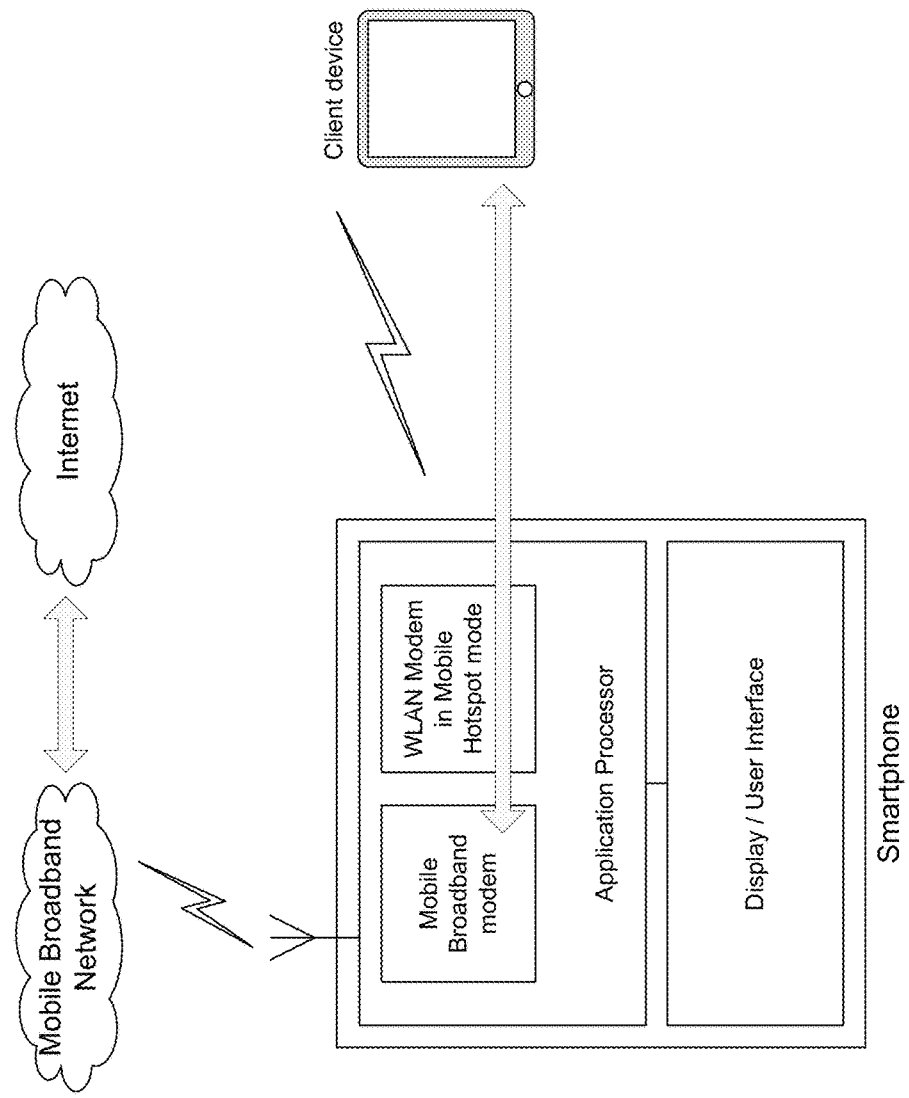
FIG. 7 illustrates a use case of internet access over a WLAN network by a client device through a smartphone operating in mobile Hotspot mode with an integrated mobile broadband modem, WLAN Access Point, and Application Processor.
Figure 8:
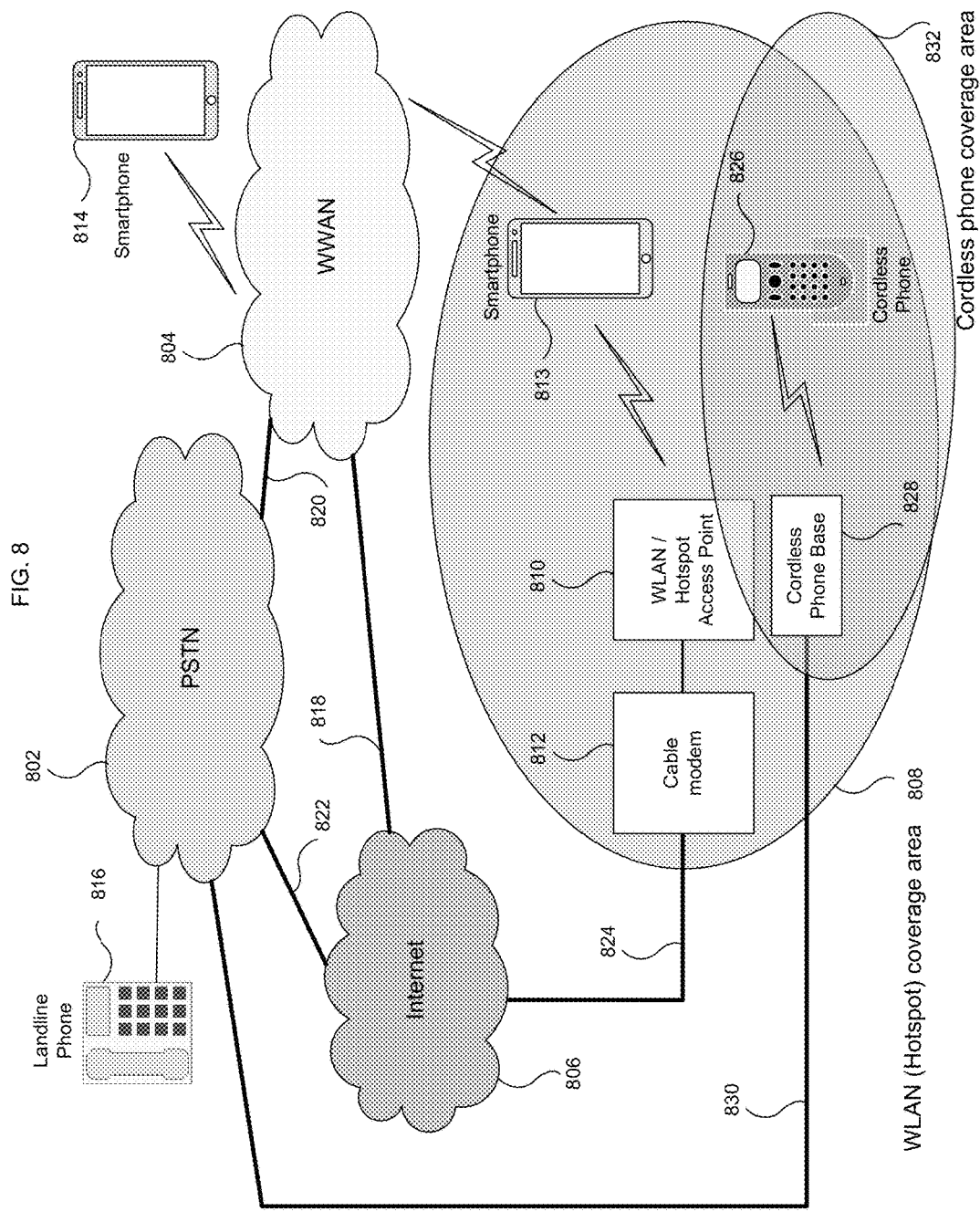
FIG. 8 illustrates a use case of a Smartphone simultaneously connected to different networks for different services.
Figure 9:
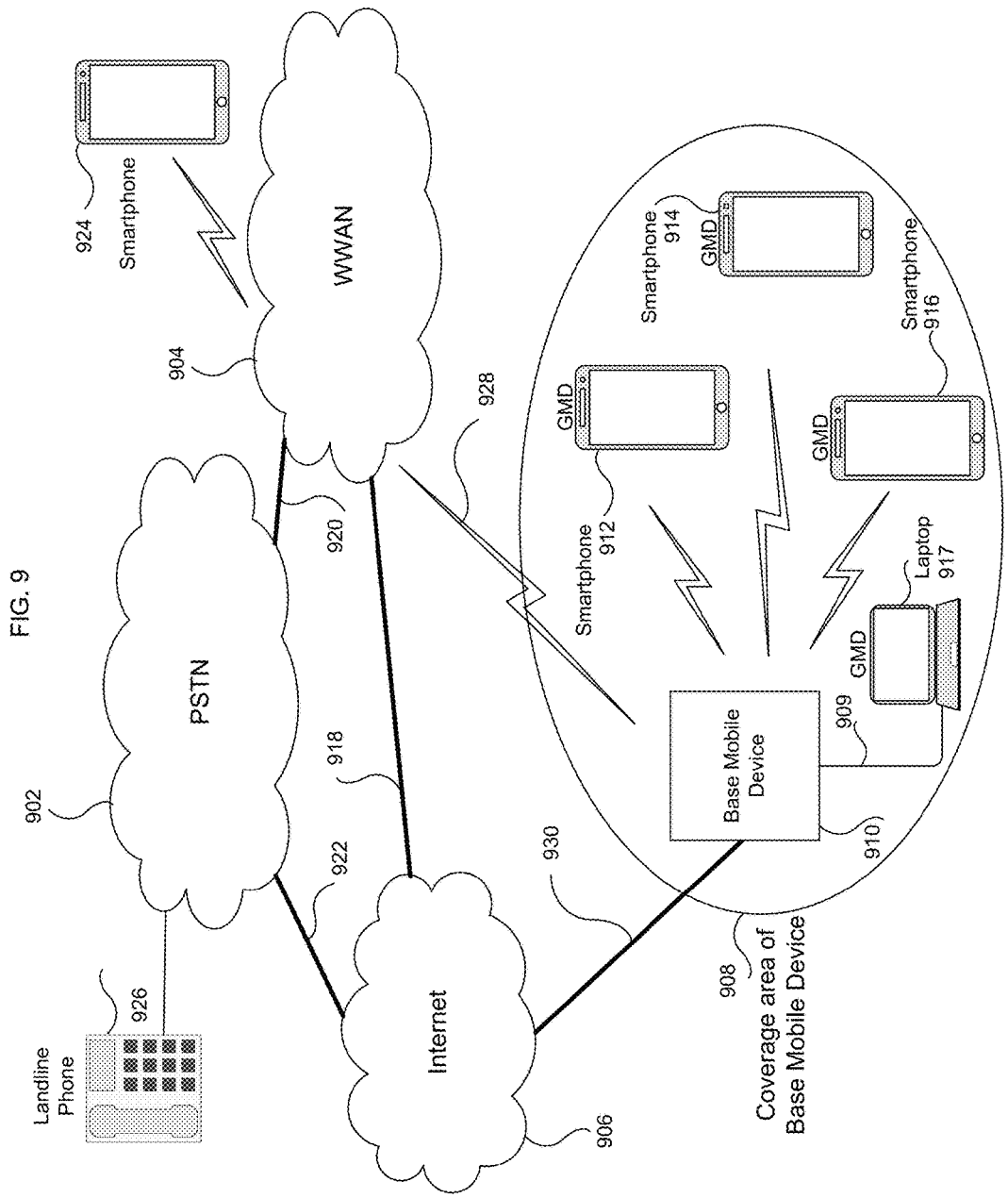
FIG. 9 illustrates a use case of Group Mobile Devices (GMD's) getting all its services including voice and video calls, SMS based text messaging and interment services from a Base Mobile Device (BMD).
Figure 10:
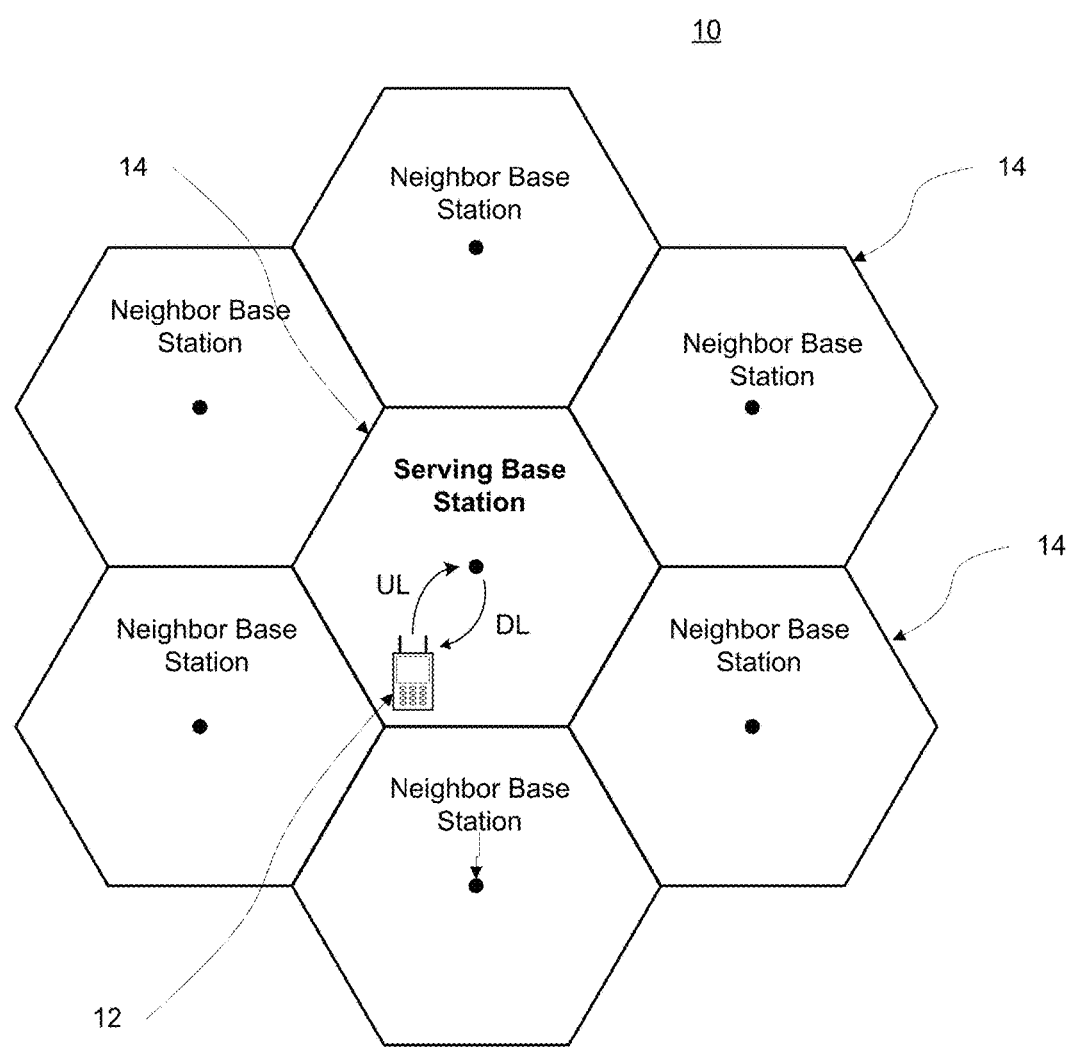
FIG. 10 illustrates a conventional wireless cellular communication system.

By way of example only, the above-described method may be implemented in a mobile Hotspot device as shown in FIG. 3.

Figure 12:
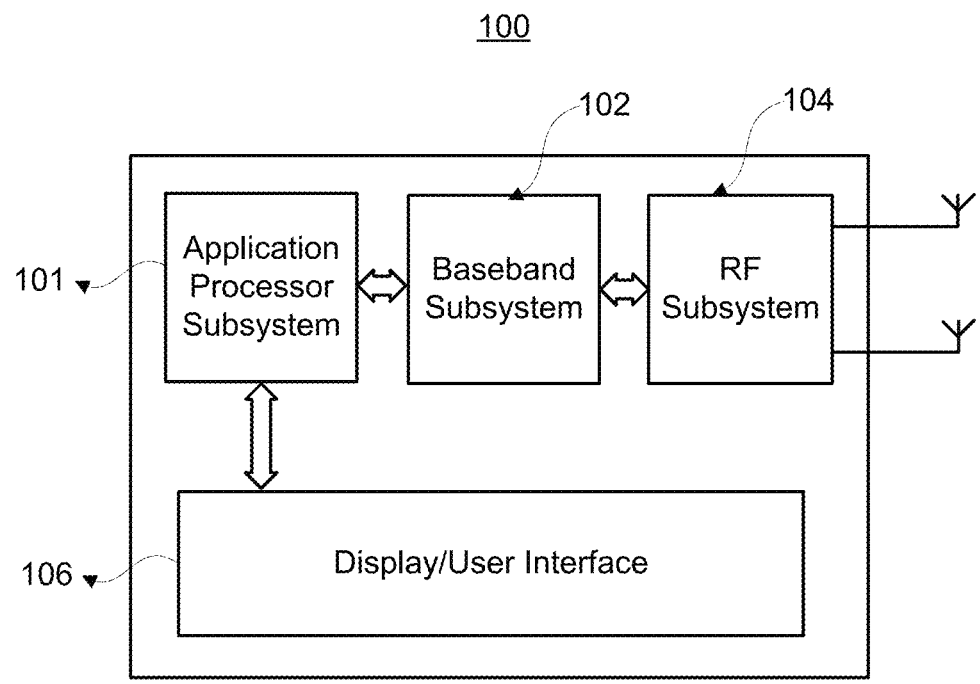
FIG. 12 illustrates a wireless mobile station diagram, which may be employed with aspects of the disclosure described herein.

As shown in FIG. 12, the mobile Hotspot 100 may include an application processor subsystem 101, baseband subsystem 102 and a radio frequency (RF) subsystem 104 for use with a WWAN and a WLAN. A display/user interface 106 provides information to and receives input from the user. By way of example, the user interface may include one or more displays, touch panel, keypad, and other input/output devices. In some mobile Hotspot devices, certain combination of the application processor subsystem 101, the baseband subsystem 102 and the RF subsystem 104 may be all integrated as one integrated chip.

Figure 13:
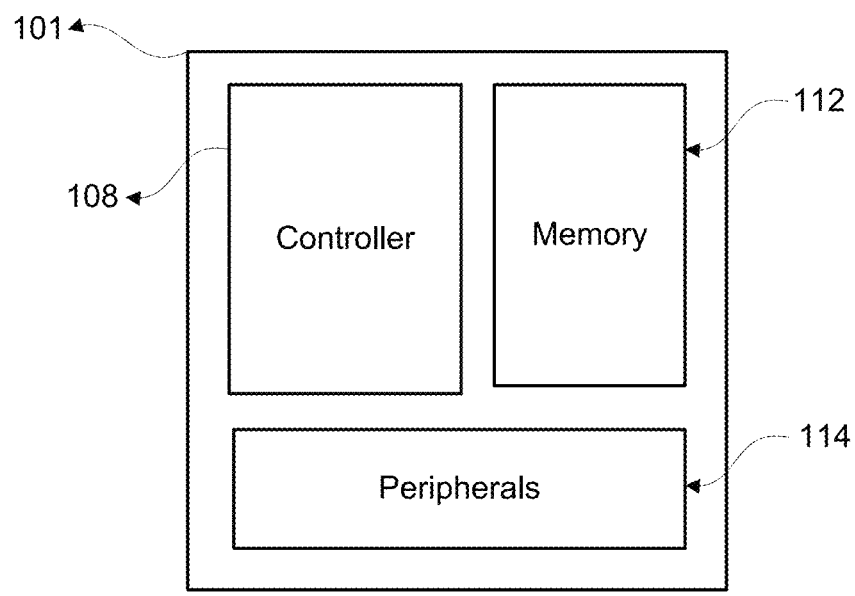
FIG. 13 illustrates an application processor subsystem for a wireless mobile station, which may be employed with aspects of the disclosure described herein.
Figure 14:
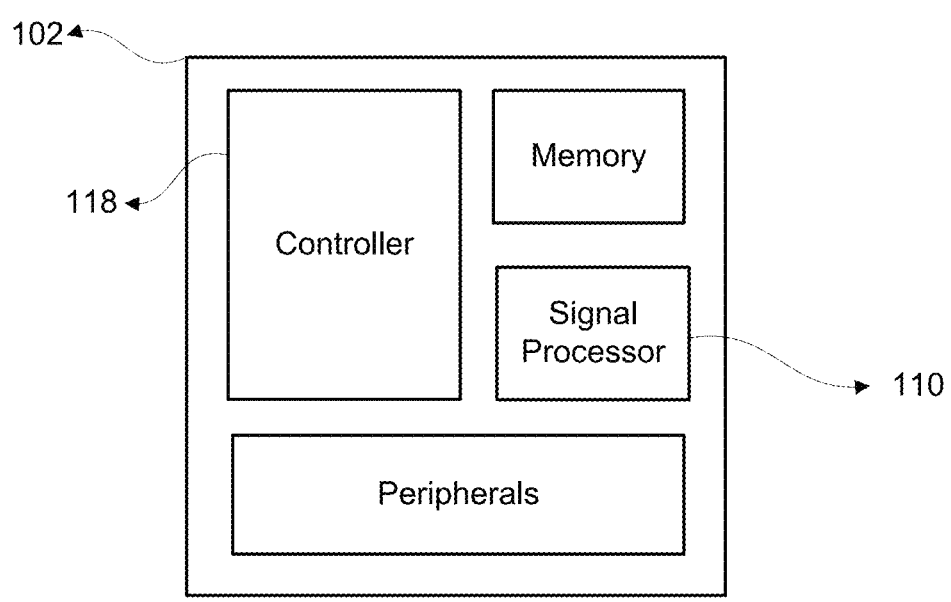
FIG. 14 illustrates a baseband subsystem for a wireless mobile station, which may be employed with aspects of the disclosure described herein.
Figure 15:
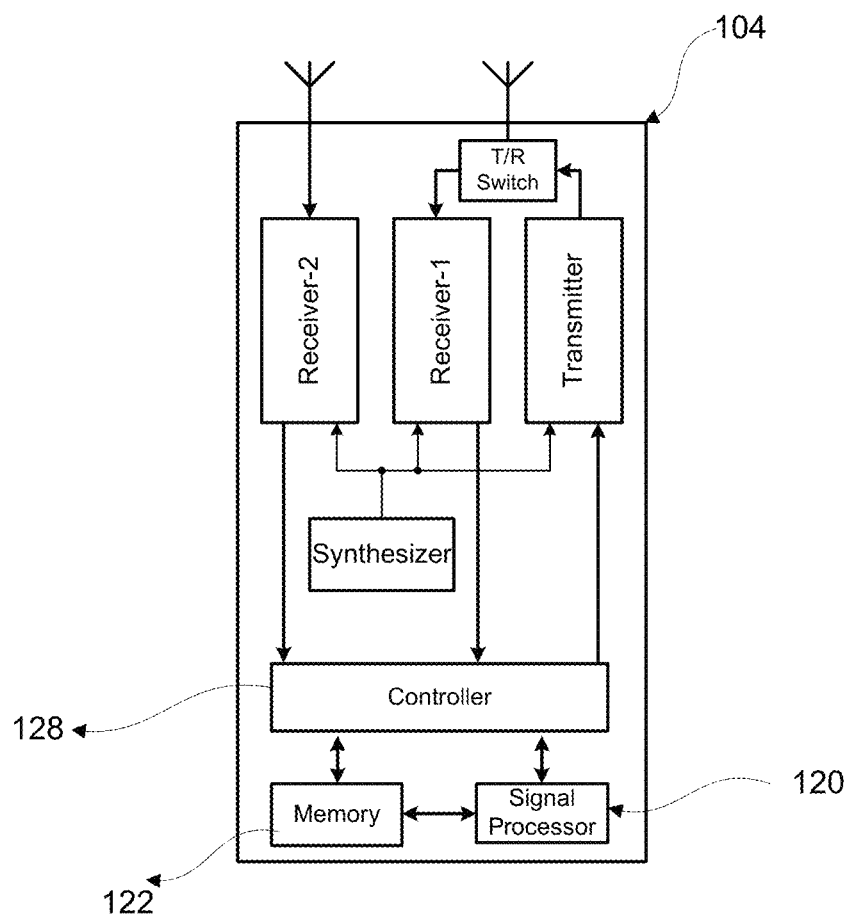
FIG. 15 illustrates an RF subsystem for a wireless mobile station, which may be employed with aspects of the disclosure described herein.

The application processor subsystem 101 as shown in FIG. 13 may include a controller 108 such as a microcontroller, another processor or other circuitry. The baseband subsystem 102 as shown in FIG. 14 may include a controller 118 such as a microcontroller or other processor. The RF subsystem 104 as shown in FIG. 15 may include a controller 128 such as a microcontroller, another processor or other circuitry. The controller 108 in FIG. 13 desirably handles overall operation of the mobile Hotspot 100. This may be done by any combination of hardware, software and firmware running on the controller 108. Such a combination of hardware, software and firmware may embody any methods in accordance with aspects of the present disclosure.

Peripherals 114 in FIG. 13 such as a full or partial keyboard, a display, touch interface, etc may be employed and managed through the controller 108.

Aspects of the present disclosure may be implemented in firmware of the controller 108 of the application processor in FIG. 13 and/or the controller 118 of the baseband subsystem of FIG. 14. In another alternative, aspects of the present disclosure may also be implemented as a combination of firmware and hardware of the application processor subsystem 101 of FIG. 13 and/or the baseband subsystem 102 of FIG. 14. For instance, a signal processing entity of any or all of the FIG. 14 may be implemented in firmware, hardware and/or software. It may be part of the baseband subsystem, the receiver subsystem or be associated with both subsystems. In one example, the controller 118 and/or the signal processor 110 of FIG. 14 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use the aspects of the disclosure may include different types of service distribution devices such as a mobile Hotspot, mobile Ethernet router, etc.

Although aspects of the disclosure herein have been described with reference to particular embodiments, it is to be understood that these embodiments are merely illustrative of the principles and applications of the aspects of the present disclosure. It is therefore to be understood that numerous modifications may be made to the illustrative embodiments and that other arrangements may be devised without departing from the spirit and scope of the aspects of the present disclosure as defined by the appended claims. Aspects of each embodiment may be employed in the other embodiments described herein.

The invention claimed is:

1. A method for controlling a connectivity state of a communication device, the method comprising:
   controlling, by a processing device at the communication device as a Service Distribution Device (SDD),
      tracking a number and type of client devices connected to the SDD and a number and type of client devices actively receiving service from the SDD;
      determining a next internal mode of operation of the SDD, based on the number and type of client devices connected to the SDD and the number and type of client devices actively receiving service from the SDD;
      informing a Wireless Wide Area Network (WWAN) about the next internal mode; and
      entering the next internal mode at the SDD, after the informing the WWAN about the next internal mode,
   controlling, by the processing device,
      when no client device is actively receiving or requesting service from the SDD, selecting a lowest power mode as the next internal mode of operation; and
      after the next internal mode of operation is selected, informing the WWAN about the next internal mode, and
   controlling, by the processing device,
      profiling usage and detecting that at least one first application is performing a periodic status update as opposed to active data transfer; and
      entering a next lower power mode as the next internal mode when periodic background access is determined,
   wherein, when the SDD is operating in the next lower power mode, the least one first application is continuing to update availability status at less than a predetermined rate.

2. The method of claim 1, further comprising:
   controlling, by the processing device, when the SDD is using a 3rd Generation Partnership Project Long Term Evolution (3GPP LTE) based WWAN, deciding whether to enter a Power Saving Modem (PSM) according to the 3GPP's specifications as the next internal mode, based on number and type of second client devices connected to the SDD and whether the second client device are actively requesting service from the SDD.

3. The method of claim 2, further comprising:
controlling, by the processing device, when at least one third client device connects to the SDD over a Short Range Wireless Links (SRWL), exiting the PSM mode with the WWAN and beginning to provide service to the at least one third client device with a predetermined latency.

4. The method of claim 1, further comprising:
controlling, by the processing device, when each second client device connected to the SDD is a delay tolerant device, entering a Discontinuous Reception (DRX) mode with a predetermined DRX cycle value as the next internal mode at the SDD.

5. The method of claim 4, further comprising:
controlling, by the processing device, when the SDD is using a 3rd Generation Partnership Project Long Term Evolution (3GPP LTE) based WWAN, deciding to use an extended DRX (eDRX) mode according to the 3GPP's specifications as the next internal mode, in which in the eDRX mode the SDD and each of the second client device enter a predetermined low power mode for at least a predetermined time.

6. The method of claim 5, further comprising:
controlling, by the processing device, when at least one third client device that is delay sensitive is connected to the SDD, exiting the eDRX mode and beginning to provide service to the at least one third client device with a predetermined minimal latency.

7. The method of claim 1, further comprising:
controlling, by the processing device, entering a joint Power Saving Modem (PSM) and extended Discontinuous Reception (eDRX mode) according to 3rd Generation Partnership Project Long Term Evolution (3GPP LTE) specification as the next internal mode, based on number and type of second client devices connected to the SDD and whether an active service is being provided to the second client devices from the SDD.

8. The method of claim 1, further comprising:
controlling, by the processing device, determining to stop performing neighbor cell detection and neighbor cell measurements when no client device is connected to the SDD.

9. The method of claim 8, wherein the determining whether to stop performing neighbor cell detection and measurements is based on an identified usage pattern.

10. The method of claim 1, further comprising:
controlling, by the processing device, determining to stop performing periodic updates of broadcast System Information (SI) when no client device is connected to the SDD.

11. The method of claim 1, further comprising:
controlling, by the processing device, determining to stop performing a serving cell System Information (SI) update based on an identified usage pattern.

12. The method of claim 1, further comprising:
controlling, by the processing device, when no client device is connected to the SDD, deregistering of the SSD with the WWAN.

13. The method of claim 1, further comprising:
controlling, by the processing device, when a second client device attempts to connect to the SDD over a Wireless LAN (WLAN) or Short Range Wireless Links (SRWL), performing registration when the SDD is not registered to the WWAN.

14. The method of claim 1, further comprising:
controlling, by the processing device, profiling a service usage pattern from each different second client device served by the SDD and, based on an identified usage pattern, autonomously changing an internal mode of the SDD and performing a predetermined procedure with the WWAN.

15. The method of claim 1, further comprising:
controlling, by the processing device, configuring the SDD with a time of day and a day of a week on which the SDD provides service.

16. The method of claim 1, wherein the periodic background access is availability status information.

17. The method of claim 1, further comprising:
controlling, by the processing device, detecting status update type of background activity based on at least one of periodic nature of traffic, size of message payloads, or source and destination address pairs.

18. The method of claim 1, wherein the predetermined rate is a predetermined Discontinuous Reception (DRX) or extended DRX (eDRX) cycle.

19. The method of claim 1, further comprising:
controlling, by the processing device, based on a usage pattern, autonomously changing a beacon signal interval on a Wireless Local Area Network (WLAN) Access Point (AP) of the SDD (i) to at least a predetermined value when no client device is expected to seek service from the SDD and (ii) to less than the predetermined value when a second client device is expected to seek service from the SDD.

20. The method of claim 19, further comprising:
controlling, by the processing device, entering at the WLAN AP in the SDD as the next internal mode a predetermined lower power state including at least one of Power Save Polling Mode (PSPM), Scheduled and Unscheduled Automatic Power Save Delivery (S-APSD and U-APSD) or Wi-Fi Multimedia (WMM) Power Save.

21. The method of claim 1, further comprising:
controlling, by the processing device, when a type of each second client device connected to the SDD is delay tolerant, autonomously changing a beacon interval on a Wireless Local Area Network (WLAN) Access Point (AP) of the SDD to at least a predetermined value.

22. The method of claim 1, further comprising:
controlling, by the processing device, when a type of at least one second client device connected to the SDD is delay sensitive, autonomously changing a beacon interval on a Wireless Local Area Network (WLAN) Access Point (AP) of the SDD to at most a predetermined value.

23. An apparatus for controlling a connectivity state of a communication device, the apparatus comprising:
circuitry configured to control, at the communication device as a Service Distribution Device (SDD),
tracking a number and type of client devices connected to the SDD and a number and type of client devices actively receiving service from the SDD;
determining a next internal mode of operation of the SDD, based on the number and type of client devices connected to the SDD and the number and type of client devices actively receiving service from the SDD;

informing a Wireless Wide Area Network (WWAN) about the next internal mode; and entering the next internal mode at the SDD, after the informing the WWAN about the next internal mode, the circuitry configured to control, when no client device is actively receiving or requesting service from the SDD, selecting a lowest power mode as the next internal mode of operation; and \after the next internal mode of operation is selected, informing the WWAN about the next internal mode, and the circuitry configured to control, profiling usage and detecting that at least one first application is performing a periodic status update as opposed to active data transfer; and entering a next lower power mode as the next internal mode when periodic background access is determined, wherein, when the SDD is operating in the next lower power mode, the least one first application is continuing to update availability status at less than a predetermined rate.

24. A wireless communication device comprising:

a receiver to receive a wireless communication; and a processing device configured for controlling a connectivity state of the wireless communication device as a Service Distribution Device (SDD), wherein the processing device is configured to control tracking a number and type of client devices connected to the SDD and a number and type of client devices actively receiving service from the SDD;

determining a next internal mode of operation of the SDD, based on the number and type of client devices connected to the SDD and the number and type of client devices actively receiving service from the SDD;

informing a Wireless Wide Area Network (WWAN) about the next internal mode; and entering the next internal mode at the SDD, after the informing the WWAN about the next internal mode, wherein the processing device is configured to control, when no client device is actively receiving or requesting service from the SDD, selecting a lowest power mode as the next internal mode of operation; and after the next internal mode of operation is selected, informing the WWAN about the next internal mode, and wherein the processing device is configured to control, profiling usage and detecting that at least one first application is performing a periodic status update as opposed to active data transfer; and entering a next lower power mode as the next internal mode when periodic background access is determined, wherein, when the SDD is operating in the next lower power mode, the least one first application is continuing to update availability status at less than a predetermined rate.

* * * * *